United States Patent [19]

Attinello

[11] Patent Number: 4,901,776
[45] Date of Patent: Feb. 20, 1990

[54] FUNNEL WITH FILL INDICATOR

[76] Inventor: Ron Attinello, 228 Garfield Pl., Brooklyn, N.Y. 11215

[21] Appl. No.: 256,507

[22] Filed: Oct. 12, 1988

[51] Int. Cl.$^4$ .................... G01F 23/06; B67C 11/00
[52] U.S. Cl. .................... 141/95; 141/297; 141/331; 73/294; 116/228; 137/558
[58] Field of Search ............. 141/94, 95, 96, 297, 141/331–345, 298–300; 73/294, 305, 306, 314, 319, 322, 322.5; 116/109, 110, 70, 227, 228; 137/558

[56] References Cited

U.S. PATENT DOCUMENTS

| | | | |
|---|---|---|---|
| 279,278 | 6/1883 | Ring | 73/294 |
| 530,690 | 12/1894 | James | 141/94 X |
| 721,870 | 3/1903 | Edison | 73/294 |
| 790,463 | 5/1905 | Taliaferro | 141/95 X |
| 820,353 | 5/1906 | Epperson | 141/95 |
| 953,065 | 3/1910 | Smith | 141/95 X |
| 1,033,173 | 7/1912 | Hoaglin | 141/297 X |
| 1,243,587 | 10/1917 | Burkett | 141/95 X |
| 1,333,756 | 3/1920 | Heimgartner | 73/294 X |
| 1,747,022 | 2/1930 | Zur Neiden | 73/322 |
| 1,805,476 | 5/1931 | Andreasen | 141/96 |
| 2,155,317 | 4/1939 | Lawrence | 141/94 X |
| 2,400,228 | 5/1946 | Franz et al. | 73/306 X |
| 2,689,651 | 9/1954 | Horsdal | 141/95 X |
| 3,630,083 | 12/1971 | Gorans | 73/294 |
| 3,915,001 | 10/1975 | Skrabs | 73/322.5 |
| 4,600,041 | 7/1986 | Nishida | 141/95 |

FOREIGN PATENT DOCUMENTS

| | | | |
|---|---|---|---|
| 2826 | 6/1931 | Australia | 141/95 |
| 131169 | 12/1947 | Australia | 141/96 |
| 630189 | 5/1963 | Belgium | 75/305 |
| 122455 | 7/1901 | Fed. Rep. of Germany | 73/294 |
| 2103149 | 8/1971 | Fed. Rep. of Germany | 141/95 |
| 557299 | 9/1924 | France | 141/95 |
| 1209899 | 10/1979 | United Kingdom | 73/314 |

Primary Examiner—Ernest G. Cusick
Attorney, Agent, or Firm—Eliot S. Gerber

[57] ABSTRACT

A funnel has a float member which rises when a container is filled to warn the user to halt the pouring of a liquid. The funnel body has a conical funnel portion with three colored circles, of different colors, at separated levels on the cone. The float member, near its top, has color marks which match the color circles on the funnel cone. When the funnel nozzle (neck) is inserted into the container orifice, one of its colored circles will meet the lip of the container. The user fills the container until the same color mark on the float member reaches the top of a sleeve which guides the float member.

5 Claims, 3 Drawing Sheets

FUNNEL WITH FILL INDICATOR

BACKGROUND OF THE INVENTION

1. Field of the Invention

The present invention relates to funnels for the pouring of liquids into a container.

2. Description of the Related Art

A common problem when filling a tank with fluid through a small aperture is overflow. For example, when pouring gasoline fuel into the fuel tank of a motorboat on the water, pollution may occur when the tank is overfilled and the gas spills.

Funnels with a full or float indicator, to indicate liquid level, have been suggested. However, they are not generally commercially available, probably because they are not both economical to manufacture and reliable to use in many circumstances.

The funnel of U.S. Pat. No. 3,630,083, issued Apr. 6, 1970, is a fill-indicator funnel which states it uses few structural parts and many of them serving more than one function. However, compared to the funnel of the present invention, the parts are relatively many in number and more complicated. Moreover, the funnel of U.S. Pat. No. 3,630,083 does not adapt itself to various sized tanks, but is useful only with tanks having the same size of opening.

SUMMARY OF THE INVENTION

The present invention is a "No-Spill" funnel. Its use is for the pouring of fluids of low to medium viscosity, such as gasoline. The funnel prevents the spilling and wasting of fuel for the tanks of lawn mowers, boats, etc. The funnel is not intended for use with automobiles.

The funnel of the present invention will rest at various levels, depending on the diameter of the opening (orifice) of the container being filled. The funnel has three parallel lines across the base of the cone, with each line at a different outside diameter. The funnel nozzle fits into a tank opening and the funnel cone rests at one of those three lines. The lines are color-coded to be matched with the same color line on a straw-like elongated and floating float member. The float member floats within a sleeve which is attached to a holder on the internal wall of the funnel. When the color line of the float member aligns itself with the appropriately matched line on the sleeve, the tank is full.

It is an objective of the present invention to provide a funnel with a warning indicator which is viewed by the user to warn him when the container being filled is close to overflowing.

It is a further objective of the present invention that the funnel may be used with containers having different sizes of openings.

It is a further objective of the present invention that the funnel is relatively simple in structure so that it may be produced and sold at a reasonable price and so that it is relatively less likely to malfunction due to a failure of one of its parts.

It is a further objective of the present invention that the funnel is designed so that it may be shipped unassembled by being stacked, one within the other, and assembled when it is sold or used.

It is a feature of the present invention to provide a funnel which warns users against the overfilling of containers. The containers have different diameter round openings with circular lips.

The funnel comprises a body member of plastic resin having an imaginary axis and having a cone-shaped funnel portion and a nozzle portion. The funnel portion and nozzle portion each have an exterior and an interior wall. A plurality of spaced indicia, preferably colored circles, are located on the external wall of the funnel portion proximate its junction with the nozzle portion. The funnel also indicates an elongated sleeve member within the internal wall of said body member which is connected to the internal wall and parallel to the axis. The sleeve member is hollow and has an elongated bore therethrough and an internal wall. Its bottom orifice, proximate the bottom orifice of the nozzle portion, permits the liquid to flow into the sleeve. A plurality of spacer members are connected to the inside wall of the sleeve. An elongated hollow and liquid-tight float member is at least partly positioned within the spacers. The float member rises within, and is guided by, the spacers as the container is filled. A plurality of spaced indicia, preferably colored circles, proximate the top end of the float member, indicates when the container is filled.

BRIEF DESCRIPTION OF THE DRAWINGS

The present invention will be better understood after considering the following detailed description taken in conjunction with the accompanying drawings.

In the drawings.

DESCRIPTION OF THE PREFERRED EMBODIMENT

The funnel of the present invention prevents the overflow of fuel. It is a funnel with a float member (float vessel) that indicates when the container (tank) is full. A liquid is poured down the funnel into a container. The funnel rests sturdily on the circular lip of the container opening (neck or orifice). An air-tight plastic float member within the sleeve indicates the fluid level of the container.

Figure 1:
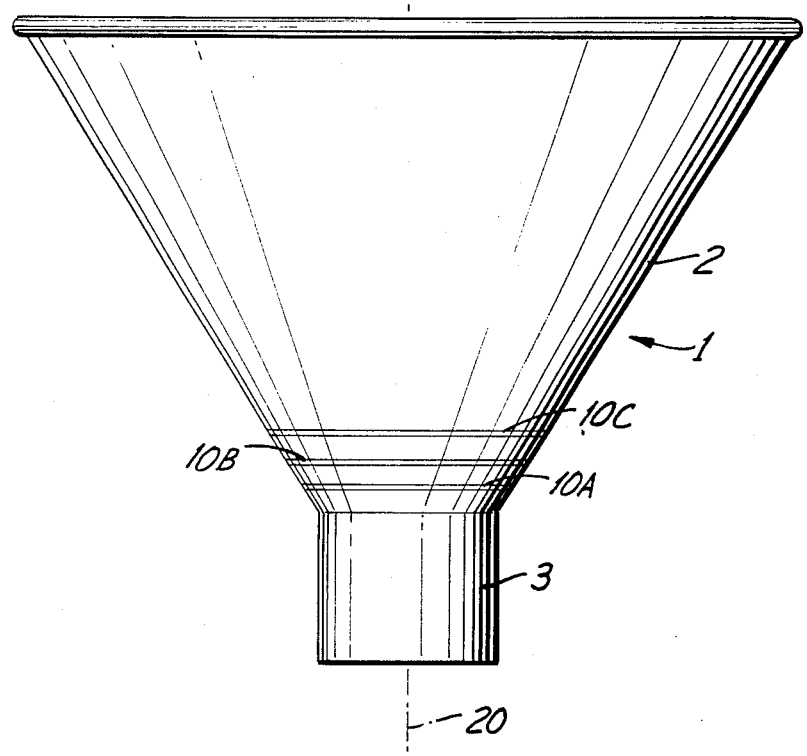
FIG. 1 is a front plan view of the funnel body portion of the present invention.
Figure 2:
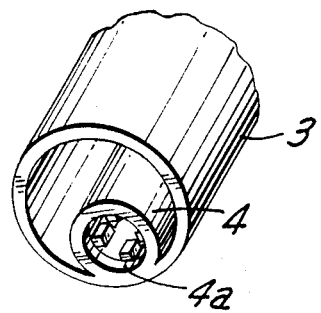
FIG. 2 is a perspective view of the bottom end of the funnel nozzle portion.
Figure 3:
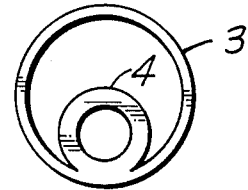
FIG. 3 is a bottom plan view of the bottom of the nozzle portion of FIG. 2.

The funnel 1 of FIG. 1 has a body portion 2 which is cone-shaped and with a right cylindrical nozzle portion 3 (neck portion). A smaller cylindrical bushing (tube) 4 is integral with and inside of the neck portion 3. The small cylinder bushing 4 holds the elongated sleeve 11. FIG. 3 shows a bottom view of the bottom of the neck, in which the bushing 4 has an internal flange 4a at its bottom end. The sleeve 11 is fitted in the bushing 4 and is positioned on the top of flange 4a.

The fluid is poured in through the top orifice 17 and flows down space 5. The fluid in the container pushes up the float member 6 and fills in all the space 7 between the float member 6 and the inside wall of the sleeve 11. The interior of both cylinders is hollow to allow fluid passage. The float body 6 sits on the bottom ledge 4a of the sleeve 11 prior to being raised (floated) by the liquid in the tank. At both ends of the vessel are four inwardly directed spacer prongs 9 (spacer means) which allow for easy movement of the float 6. The prongs 9 are evenly spaced about the axis 20.

Figure 4:
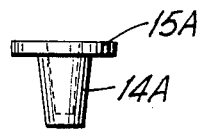
FIG. 4 is a side plan view of a plug.

The funnel 2 at its lower external wall proximate the nozzle portion 3 has three concentric container level lines 10A, 10B, 10C, see FIG. 4. The level lines are preferably colored circles, for example, 10A is red, 10B is black, and 10C is yellow. These lines 10A-10C wrap completely around the lower end of the funnel portion 2 of the funnel, just above the nozzle portion 3. The first container level line 10A is ¼-inch above the point where the nozzle portion 3 of the funnel begins. The next two lines are in ¼-inch increments progressively closer to the funnel top. These container level lines are used to determine the full level for various containers of different sized openings. Depending upon the size of the opening of a particular container to be filled, the funnel will sit higher or lower in the container opening. The line 10A, 10B or 10C closest to the lip (rim) of the container openings will be the color that corresponds to the colored lines of the float member.

The float sleeve 11, made of clear plastic, contains a long thin float member 6. The float sleeve 11 is force-fitted within the cylindrical bushing 4. The length of the bushing 4 is about the same as the length of the nozzle, preferably about 1-inch long. The sleeve 11 is open at its top 12 and bottom 13. Four short prong spacers are integral and inside of each end, i.e., there are eight prong spacers. These prong spacers hold the float member away from the inside wall of the sleeve, allowing the float to move freely up and down the length of the sleeve. The sleeve 11 and the float member 6 are parallel, along their lengths, to the axis 20.

Figure 5:
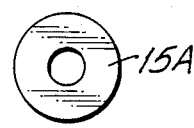
FIG. 5 is a top plan view of a plug.
Figure 9:
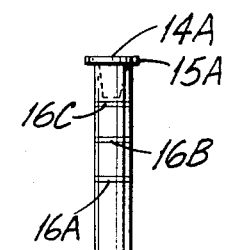
FIG. 9 is a side view of the float member.
Figure 6:
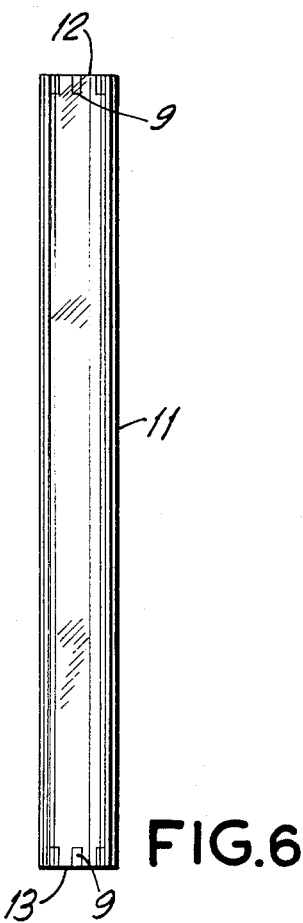
FIG. 6 is a side plan view of the sleeve member.
Figure 8:
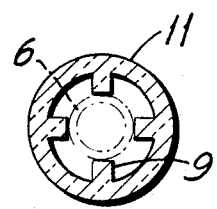
FIG. 8 is an enlarged cross-sectional view of the sleeve member of FIG. 6 and also showing the float member.
Figure 7:
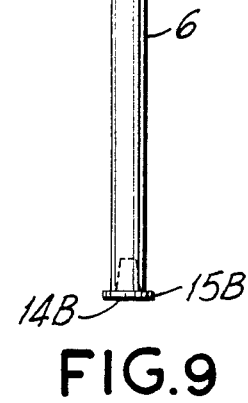
FIG. 7 is a bottom plan view of the sleeve member of FIG. 6.
Figure 10:
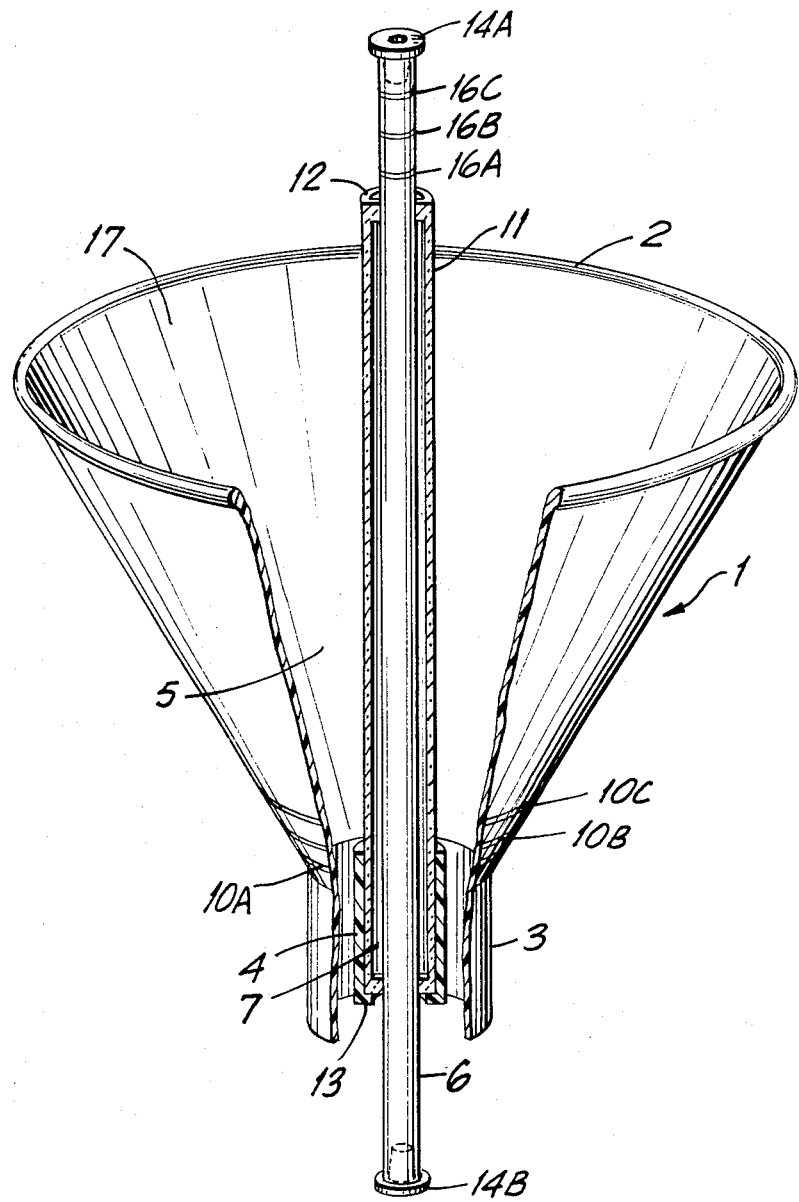
FIG. 10 is a front perspective view, partly cut-away, of the entire funnel, with the front of the funnel partly cut-away to view its interior.

The float member 6 is a long air-tight plastic tube, similar to a drinking straw. Plugs 14A and 14B, at opposite ends, seal the float member 6 and prevent the float member 6 from falling out of the sleeve. See FIG. 5 for a top view of a plug 14A which shows its outwardly extending flange portion 15A. The flange portions 15A and 15B, of plugs 14A and 14B respectively, have larger outer diameters than the openings of the sleeve 11 to prevent the plug flanges 15A and 15B from entering the sleeve 11. A small circular opening formed by the gaps between spacer prongs 9 in the bottom of the sleeve 11, allows the liquid to get in the sleeve and push up the float member 6. At the top of the float, as shown in FIG. 4, are three colored parallel and circular indicia lines 16A, 16B and 16C. Preferably, 16A is red, 16B black, and 16C yellow, and they are spaced ¼-inch apart. When the appropriate colored line on the float 6 meets the top end 12 of the sleeve 11, i.e., the same color of line 16A-16C as the color of the line 10A-10C where the funnel rests, the tank is full.

The method of operating this apparatus is to pour fluid down the funnel orifice 17. The full level line 16A, 16C or 16C of the float member is determined by the corresponding indicia line on the funnel body at which the funnel rests in the container opening. Fluid is added until the float member begins to move. Then the pouring is slowed while watching the float's rise to match the full level line, i.e., rise to the top of the sleeve. When the float member indicia line aligns with the top of the sleeve, pouring should be stopped. For example, if the funnel is in a tank opening with line 10A at the lip opening, then the tank is full when line 16A meets top 12 of the sleeve 11.

Preferably the funnel body member, consisting of the funnel portion 2 and nozzle portion 3, along with the bushing holder 4, is injection-molded as an integral one-piece member of a suitable relatively stiff plastic resin, such as polycarbonate, which will resist chemical action from gasoline. The following are typical preferred dimensions and are intended as guidance to produce one size of funnel. The funnel body wall is 1/16-inch thick; the height of the cone-shaped funnel portion 2 is 3¼ inches (along axis 20); the height of the nozzle portion is 1-inch (along axis 20); the outside diameter of the top lip of the funnel is 5-5/16 inches; the outside diameter of the nozzle portion is 1-3/16 inches; the outside diameters of the three circular indicia 10A-10C are 1-6/16, 1-10/16 and 1-14/16 respectively; the outside diameter of sleeve 11 is ½-inch; the wall thickness of sleeve 11 is 1/16-inch; the prong spaces are 1/16-inch thick from the inside wall of the sleeve towards its center and ⅛-inch long parallel to the imaginary axis of the sleeve; the sleeve is 5-1/4 inches long; the float member is 7½ inches long and has an outside diameter of 7/32-inch.

Alternatively, and not shown, the spacer means (the spacer prongs) may be connected to the float member instead of the inside wall of the sleeve member. Also, alternatively, and not shown, the colored spaced indicia, for example colored circles, may be placed on the sleeve member near its top. When a mark on the float member aligns with a colored circle on the sleeve member corresponding in color to the indicia circle on the funnel portion at the lip of the container, the container is full.

What is claimed is:

1. A funnel to prevent overflow from the overfilling of containers having different diameter round openings with circular lips by indicating to the user that the container has been filled with liquid, said funnel comprising:

a body member of plastic resin having an imaginary axis and having a cone-shaped funnel portion and a nozzle portion without indicia thereon, said funnel portion and nozzle portion each having an exterior and an interior wall;

a plurality of spaced funnel indicia on the external wall of said funnel portion proximate the junction of said funnel portion and said nozzle portion, each of said plurality of funnel indicia being spaced perpendicular to said axis, each of said plurality of funnel indicia being adapted to meet with the respective lip of a different one of said openings;

an elongated sleeve member within the interior wall of said nozzle portion, connected to said interior wall and parallel to said axis, said sleeve member being hollow and having an interior wall forming an elongated bore therethrough, said sleeve member having a bottom orifice through which said liquid may flow;

an elongated hollow and liquid-tight float member at least partly positioned within said bore of the sleeve member and having a top end, said float member rising within the sleeve member bore as the container is filled; a plurality of float member indicia on said float member proximate the top end of said float member to indicate when the container is filled, comprising a plurality of spaced lines which are spaced along the float member with the same spacing as between the said plurality of funnel indicia on the external wall of the funnel portion; and a plurality of spacer means positioned between the interior wall of said sleeve member and said float member to prevent the float member from touching said sleeve member inside wall.

2. A funnel as in claim 1 and further comprising an elongated bushing portion which is integral with the interior of said nozzle portion, said sleeve member being force-fitted within said bushing portion.

3. A funnel as in claim 1 wherein said plurality of funnel indicia on said funnel portion are in colors different from each other and said plurality of float member indicia on said float member are in colors different from each other, and the two sets of indicia correspond to each other in color.

4. A funnel as in claim 1 wherein said float member comprises an elongated hollow straw and two end plugs, said plugs sealing the opposite ends of said straw.

5. A funnel as in claim 4 wherein each of said plugs has an external flange, the plug flanges are positioned outside of said sleeve member and the flanges prevent the plugs from being drawn entirely into said sleeve member.

* * * * *